United States Patent

[11] 3,564,348

[72] Inventor David M. Cheseldine
 Bennington, Vt.
[21] Appl. No. 814,089
[22] Filed Apr. 7, 1969
[45] Patented Feb. 16, 1971
[73] Assignee Sprague Electric Company
 North Adams, Mass.
 a corporation of Massachusetts

[54] TITANIUM-ANTIMONY ALLOY ELECTRODE ELECTRICAL CAPACITOR
 3 Claims, 1 Drawing Fig.
[52] U.S. Cl. .................................................. 317/230, 317/238
[51] Int. Cl. .................................................. H01g 9/05
[50] Field of Search ...................................... 317/230, 231, 232, 233, 258

[56] References Cited
UNITED STATES PATENTS
| | | | |
|---|---|---|---|
| 2,299,228 | 10/1942 | Gray et al. ..................... | 317/230 |
| 2,504,178 | 4/1950 | Burnham et al. ............. | 317/230 |
| 3,098,182 | 7/1963 | Burnham ...................... | 317/230 |
| 3,126,503 | 3/1964 | Salomon ....................... | 317/230 |
| 3,255,389 | 6/1966 | Salomon et al. ............. | 317/230 |
| 3,270,261 | 8/1966 | Mohler et al. ................ | 317/230 |

Primary Examiner—James D. Kallam
Attorneys—Connolly and Hutz, Vincent H. Sweeney, James Paul O'Sullivan and David R. Thornton

ABSTRACT: An electrical capacitor is provided having at least one electrode comprising an alloy of titanium and antimony. An antimony concentration of 10 to 30 percent by weight provides an electrode material on which a stable anodic film is grown, such film being characterized by good thermal and electrical stability.

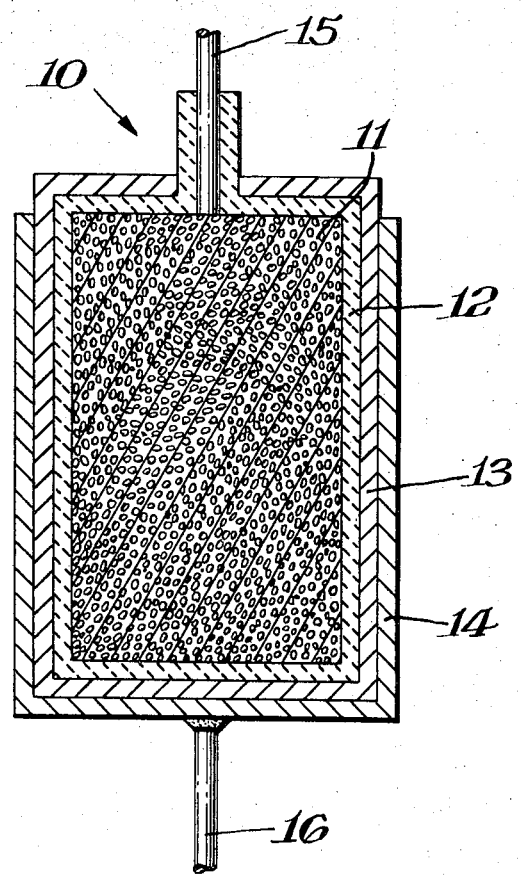

3,564,348

TITANIUM-ANTIMONY ALLOY ELECTRODE ELECTRICAL CAPACITOR

BACKGROUND OF THE INVENTION

This invention relates to electrolytic capacitors and more particularly to a capacitor having an anodic oxide dielectric formed on an alloy of titanium and antimony.

Heretofore, the elemental metals aluminum and tantalum have been widely used as dielectric oxide film-forming electrodes in the making of electrolytic capacitors. Tantalum oxide has a high dielectric constant and hence high capacity per unit area, good mechanical strength and excellent chemical resistance for both oxide and metal. However, tantalum has the disadvantage of relatively high cost and greater weight.

Aluminum is low in cost, has a low density and is easily etched to increase the surface area. However, aluminum has a relatively lower dielectric constant, poorer mechanical strength and lower resistance to corrosion than tantalum.

While anodic films may be grown on many other materials, none are presently being used in making electrolytic capacitors because of poor electrical and thermal stability of the films produced. Titanium is one of the materials considered for such use in view of the high dielectric constant of its oxide and its good corrosion resistance, low density and relatively low cost. However, it has been found that continuous oxide films for dielectric purposes cannot readily be formed to acceptable voltage levels on the titanium metal by conventional anodizing methods such as used in connection with aluminum and tantalum. For example, during the anodization, the film stops growing uniformly and gas evolution occurs at points on the surface at voltages well below 100 volts. Furthermore, even when an electrolyte does form higher voltage films the dielectric films are not electrically stable. They exhibit a tendency for capacity to increase with time and to show a strong dependence on bias voltage.

In an attempt to form oxides at higher voltage levels, various elements such as palladium, niobium, tantalum, tin, boron, vanadium, chromium and aluminum have been alloyed with titanium but the anodic films formed on such alloys usually suffer from one or more defects such as instability with heat or DC bias, high dissipation factors or high leakage current.

It is therefore an object of the present invention to provide capacitors having electrodes which can be anodized to form dielectric films without the above cited disadvantages.

It is another object to provide an electrode for such a capacitor on which anodic films may be grown over a wide range of thicknesses.

SUMMARY OF THE INVENTION

Broadly this invention concerns electric capacitors having novel anodic film-forming electrodes. More particularly, such electrodes comprise an alloy of titanium and antimony. It has been found that a stable anodic film can be grown on such an alloy composition thereby providing films having relatively high capacity compared to aluminum oxide but somewhat below that of tantalum oxide. An optimum titanium composition by weight has been found to fall within 70 to 90 percent. The alloy composition is considerably cheaper and lighter than tantalum yet offers comparable mechanical strength and chemical resistance; the anodic films formed thereon can be produced in conventional aqueous electrolytes or in organic electrolytes. These films are further characterized by uniform interference colors, high breakdown voltages, low electronic leakage currents and low dissipation factors.

BRIEF DESCRIPTION OF THE DRAWING

The sole drawing shows a solid electrolyte capacitor in which the novel electrode is embodied.

DETAILED DESCRIPTION OF THE INVENTION

In accordance with the present invention, an alloy of titanium and antimony is prepared by any preferred means. This alloy is then processed, using standard metallurgical techniques, to the required anode shape depending on the form of the capacitor it is desired to make. Common forms of electrolytic capacitors use anodes shaped as thin foils, wires or pellets consisting of sintered particles. The shaped alloy is then anodized in any suitable electrolyte to form the high-quality dielectric film which is a feature of the invention. The capacitor unit may be completed by combination with a "wet" or "solid" electrolyte and by adding another electrode.

Referring to the drawing, there is shown a solid electrolyte capacitor 10 with an anode 11 composed of the sintered titanium alloy of (80 invention as 20 more fully described. A dielectric oxide film 12 is formed on the surface of the anode and a coating 13 of a suitable solid electrolyte such as manganese dioxide overlies dielectric oxide film 12. The cathode electrode 14 is formed by coating the outer surface of the electrolyte with an appropriate metal such as silver. A film-forming lead wire 15 made from the alloy or any other film-forming metal contacts anode 11. A cathode lead 16 is suitably joined by welding or otherwise connecting the lead to electrode 14. The entire unit is then encapsulated with a preferred sealant (not shown).

The alloy of which anode 11 is composed was prepared in an arc furnace by mixing the powders of the constituent metals (80 percent titanium, 20 percent antimony by weight in this embodiment) and melting the mixture in an inert atmosphere by striking an arc between a mobile tungsten electrode and the powder mixture. The anode is formed by well-known powder metallurgy techniques wherein the spherical particles of the alloy are compressed and sintered into a compact mass.

Other means of preparing the alloy are available however, e.g. vacuum induction melting and sintering. The method of alloy preparation does not constitute any part of this invention.

Tests have been made to determine the characteristics of alloys of differing composition than the example above. It has been found that a composition comprising above 90 percent by weight of titanium, while anodizing to a higher voltage than pure titanium, formed less stable films. At 70 percent by weight of titanium, the composition gave a rather non-homogeneous alloy on which it was difficult to obtain a good surface. On compositions comprising less than 70 percent of titanium, the alloy tended to become brittle and to crack during solidification. An optimum composition range would therefore be 70 to 90 percent by weight of titanium.

The following examples illustrate the dielectric properties of anodic films which may be formed on an alloy containing 20 percent of antimony.

The alloy was anodized to 90 volts in an aqueous solution of 10 percent phosphorous acid at 25° C. using a current density of 0.6 ma./cm$^2$. Almost any other electrolyte may be used which does not attack the film and which is sufficiently dilute so that the oxide film does not break down due to scintillation at the anodizing voltage. The final voltage was held for 45 minutes until the current decayed to 15 $\mu$a/cm$^2$. When measured in a solution of 10 percent ammonium dihydrogen phosphate, the film showed a capacity of 0.14 $\mu$f/cm$^2$ or a capacity voltage product (CV) of 12.5 $\mu$f-v./cm$^2$. This compares with a CV of about 14 $\mu$f-v./cm$^2$ for tantalum and 6.5 $\mu$f-v./cm$^2$ for aluminum. The dissipation factor in the same solution was 1.2 percent at 120 cycles. The electrode was then immersed for a period of 1 month in a working electrolyte at 85° and 47 VDC applied against a tantalum cathode. After an initial period of 3 days the leakage current stabilized at a steady value of about 3 × 10$^{-3}$$\mu$a/cm$^2$. Periodic measurements of capacity and dissipation factor showed no significant changes. The dissipation factor remained at about 1 percent while the change in capacity, measured both at zero and 50 VDC bias, was less than 3 percent.

As a further example the alloy of the present invention was anodized in 0.01 MH$_3$PO$_4$ at voltages up to 350 v. The film formed at the upper end of the voltage range still showed a bright interference color with no noticeable surface gas evolution. By comparison, titanium anodized under similar conditions broke down at about 20 v. and showed irregular interference colors and gas evolution prior to breakdown.

While the above example has described a capacitor having a sintered anode formed of the described alloy mixture, it is understood that the novel electrode could be formed as a foil or wire depending upon the capacitor configuration and use. And instead of a solid electrolyte any preferred "wet" electrolyte solution may be used and enclosed within the appropriate casing.

I claim:

1. An electrical capacitor comprising spaced electrodes, at least one of said electrodes being an alloy of titanium and antimony, said at least one electrode having an anodic dielectric oxide film formed thereon and disposed between said electrodes.

2. A capacitor as described in claim 1 wherein titanium is present in the alloy in the amount of 70—90 percent by weight.

3. A capacitor as described in claim 1 wherein said at least one electrode is a sintered mass of particles of said alloy and wherein a layer of semiconductive material overlies said dielectric oxide film.

UNITED STATES PATENT OFFICE
CERTIFICATE OF CORRECTION

Patent No. 3,564,348          Dated February 16, 1971

Inventor(s) David M. Cheseldine

It is certified that error appears in the above-identified patent and that said Letters Patent are hereby corrected as shown below:

Column 2, line 12, omit "(80 invention as 20" and insert -- the invention as hereinafter --
    Column 2, line 65, change "85°" to -- 85°C --
    Column 3, line 3, change "20" to -- 70 --

Signed and sealed this 13th day of July 1971.

(SEAL)
Attest:

EDWARD M. FLETCHER, JR.
Attesting Officer

WILLIAM E. SCHUYLER, JR.
Commissioner of Patents